(12) United States Patent
Rocker et al.

(10) Patent No.: US 6,527,894 B1
(45) Date of Patent: Mar. 4, 2003

(54) METHOD FOR PRODUCING FIBRE-REINFORCED PLASTIC COMPONENTS

(75) Inventors: Olaf Rocker, Stade (DE); Franz Stadler, Böhmfeld (DE); Stefan Utecht, Kaufering (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/541,696

(22) Filed: Apr. 3, 2000

(30) Foreign Application Priority Data

Apr. 1, 1999 (DE) .......................... 199 15 083

(51) Int. Cl.$^7$ .............................. B32B 31/04; B32B 7/10
(52) U.S. Cl. ...................... 156/182; 156/285; 156/306.6
(58) Field of Search ................................ 156/285, 286, 156/306.6, 307.3, 308.2, 181, 182; 244/126

(56) References Cited

U.S. PATENT DOCUMENTS

| 4,622,091 A | 11/1986 | Letterman |
| 4,786,343 A | * 11/1988 | Hertzberg .................... 156/93 |
| 5,281,388 A | 1/1994 | Palmer et al. ............... 264/571 |
| 5,526,767 A | 6/1996 | McGuiness et al. |
| 5,851,336 A | * 12/1998 | Cundiff et al. ........... 156/272.2 |
| 6,139,942 A | * 10/2000 | Hartness et al. ......... 428/298.1 |

FOREIGN PATENT DOCUMENTS

| DE | 199 15 083 | 4/2000 |
| JP | 59-165647 | 9/1984 |
| JP | 3-109436 | 5/1991 |
| JP | 3-109437 | 5/1991 |
| JP | 7-276233 | 10/1995 |

* cited by examiner

*Primary Examiner*—Michael W. Ball
*Assistant Examiner*—Todd J. Kilkenny
(74) *Attorney, Agent, or Firm*—Crowell & Moring LLP

(57) ABSTRACT

A method for producing a fibre-reinforced plastic component includes (1) prefabricating an unwindable part of the plastic component as a prepreg semi-finished material; (2) prefabricating a non-unwindable part of the plastic component as a textile semi-finished material; (3) applying a resin film to said textile semi-finished material; (4) joining said textile semi-finished material and said prepreg semi-finished material in a curing device; (5) evacuating said curing device; and (6) subjecting said curing device to temperature and pressure treatment in an autoclave.

12 Claims, 2 Drawing Sheets

METHOD FOR PRODUCING FIBRE-REINFORCED PLASTIC COMPONENTS

BACKGROUND AND SUMMARY OF INVENTION

This application claims the priority of German patent document 199 15 083.4, filed Apr. 1, 1999, the disclosure of which is expressly incorporated by reference herein.

The present invention relates to a method for producing fibre-reinforced plastic components comprising not completely unwindable geometries, in particular for the production of integrally reinforced planking fields.

It is known to produce components of this type from semi-finished materials in a prepreg technique (i.e., the large area skin field of a planking field and the stiffening profiles for integral reinforcement). Due to the non-unwindable geometries of the stiffening profiles, the stiffening profiles need to be laminated manually, in contrast to the automatic laying of the skin field, thus accounting for a large part of the entire production costs for producing integrally reinforced planking fields.

A further known process is the resin film infusion (RFI) process. In this process, pre-hardened resin film is applied to dry tissue in a curing device and the curing device thus loaded and evacuated is subjected to suitable temperature and pressure treatment in an autoclave to cure the fibre-reinforced plastic component. The known RFI process is limited to resin infusion and curing of dry tissue parts. No application of the RFI process to prepreg semi-finished materials is known.

It is the object of the present invention to provide a cost effective method for producing fibre-reinforced components comprising not completely unwindable geometries.

In the method according to the present invention, the conventional prepreg production is advantageously combined with a resin film infusion method. The unwindable part of the plastic component (e.g., the large area skin field of a planking field) is prefabricated in conventional design as a prepreg semi-finished material. The non-unwindable stiffening profile, which is applied to the skin field for integral stiffening, is prefabricated as a textile semi-finished material. A resin film is applied to the non-unwindable stiffening profile before it is joined to the prepreg semi-finished material in a curing device comprising a flexible vacuum hood. For joining the plastic component, the loaded and evacuated curing device is subjected to temperature and pressure treatment in an autoclave.

When applying the method according to the present invention, the very costly process of manual laying and cutting out of a prefabricated stiffening profile made in the usual prepreg design is not required. The textile semi-finished materials used according to the present invention can largely be produced in an automated process and thus can be produced economically.

Other objects, advantages and novel features of the present invention will become apparent from the following detailed description of the invention when considered in conjunction with the accompanying drawings.

DETAILED DESCRIPTION OF THE DRAWINGS

Figure 1:
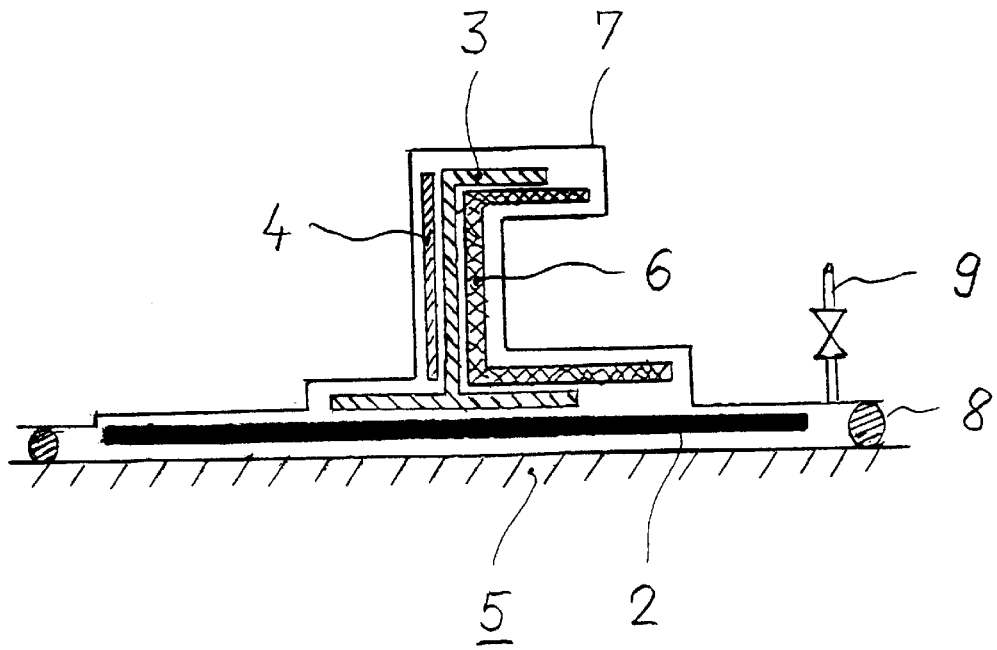
FIG. 1 shows the principle of the method according to the present invention using the example of an integrally reinforced planking field.

The method design shown in FIG. 1 comprises a curing device 5 with flexible vacuum hood 7; sealing tape 8 and connection piece 9 for suction; a prepreg semi-finished material 2; a textile semi-finished material 3; a resin film 4; and a profile tool 6.

The prepreg semi-finished material 2 comprises an unwindable geometry that is prefabricated in the known automated prepreg technique, e.g., as a tissue prepreg. The prepreg semi-finished material 2 is placed on the base area of the curing device 5. Differing from the principal representation shown in FIG. 1, the base area can be curved corresponding to the prepreg semi-finished material 2 to be processed, as is the case, for example, in a skin field of a planking field. For reasons of clarity, any separating foils and smoothing foils additionally used in a curing device (e.g., the usual separation foil between the base area and the prepreg semi-finished material 2 placed on it) are not shown.

The textile semi-finished material 3 is positioned on the prepreg semi-finished material 2, which during the process is supported in a dimensionally stable way by the removable profile tool 6. Technical fibres, usually carbon, glass, or aramide fibres are used as basic materials for the textile semi-finished material. This base material is prefabricated in one or several textile production processes to form the textile semi-finished article 3. The most common textile production processes suitable for this are sawing, embroidering, braiding, and weaving.

In the example shown in FIG. 1 the textile semi-finished material 3 is a stiffening profile in the socalled "LZ-shape" for a planking field. The designation "ILZ-shape" is named after the cross-sectional shape of the stiffening profile. Irrespective of the embodiment shown, the method according to the present invention can also be used for textile semi-finished materials 3 of any other non-unwindable geometries. Furthermore, textile semi-finished materials 3 can be used which comprise several sections which are loose in respect to each other and which are joined in the curing device.

The resin film 4 is placed onto a suitable free surface of the textile semi-finished material 3. FIG. 3a to FIG. 3d Show possible alternatives for placing the precured resin film 4 using the example of a textile semi-finished material 3, shaped as an LZ-stiffener, for a planking field. It would not be suitable to apply the resin film 4 between the profile tool 6 and the textile semi-finished material 3. In the case of multilayer textile semi-finished materials 3, the resin film 4 can be arranged between the individual layers of the textile semi-finished material 3.

All those products which become highly fluid during heating and which are thus able to infiltrate textile semi-finished materials, can be used as resin films 4. The flexible vacuum hood 7 is placed over the construction described above, and said vacuum hood 7 is sealed off from the environment using sealing tape 8. By way of connection piece 9 for suction, the loaded curing device is evacuated so that any gas pockets from the initially still dry textile semi-finished material 3 are sucked off, and in this way optimal resin film infusion of the textile semi-finished material 3 is supported.

The loaded and evacuated curing device 5 is subjected to heat and pressure in an autoclave where initially, inter alia, resin film infusion of the textile semi-finished material 3 and subsequently curing of the complete, integrally reinforced component, takes place.

Figure 2:
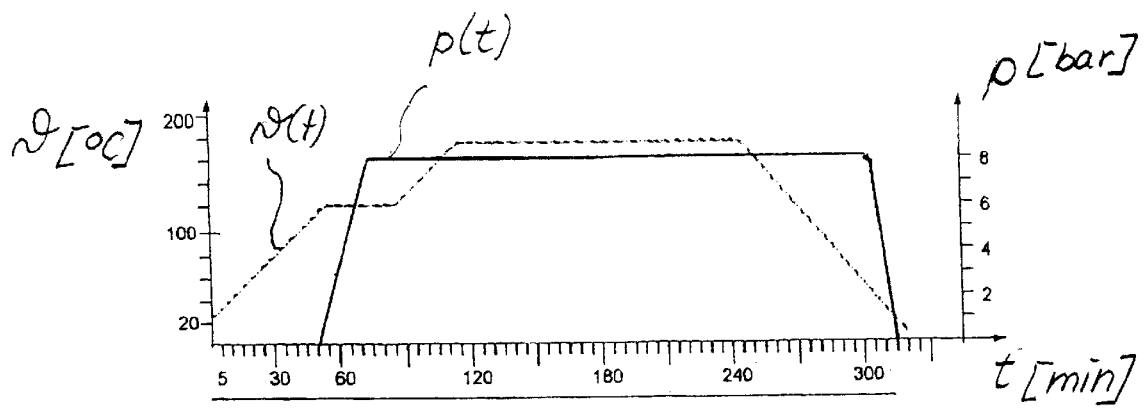
FIG. 2 shows an example of a suitable temperature and pressure gradient for carrying out the method.
Figure 3A:
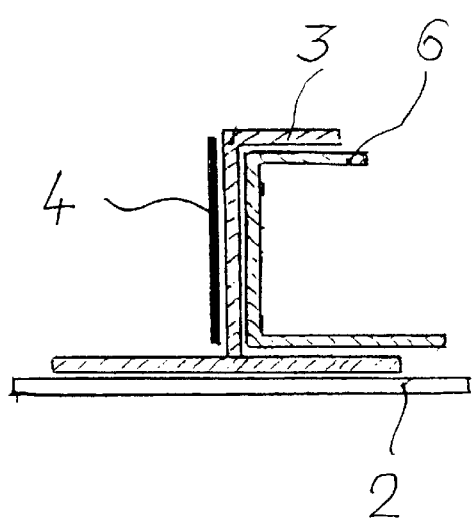
FIG. 3a to FIG. 3d show several alternatives for positioning the pre-cured resin film, using the example of an LZ-stiffener.
Figure 3B:
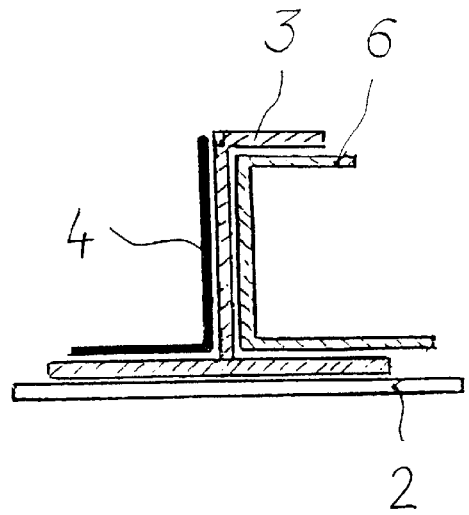
Figure 3C:
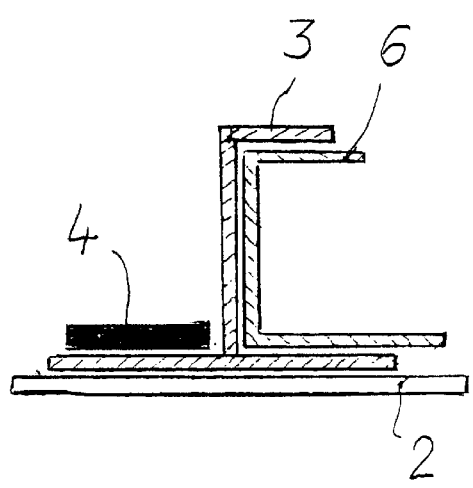
Figure 3D:
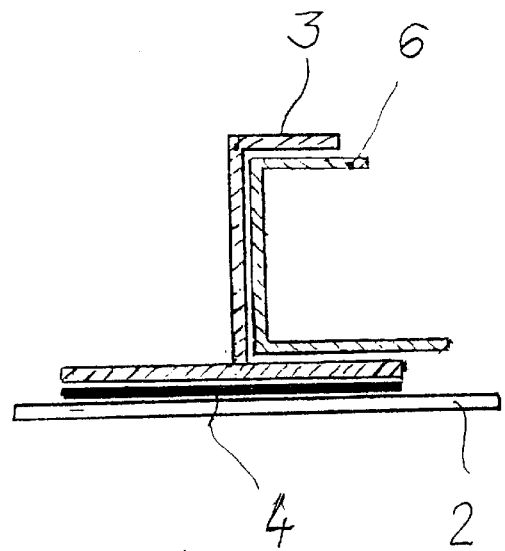

FIG. 2 shows an example suitable for the method according to the present invention, of a temperature and pressure curve in the autoclave. The temperature curve δ(t) has two holding stages. The first holding stage is initiated at temperature δ at which the viscosity of the resin used is lowest. The duration of this holding stage is such that the resin infiltrates the textile semi-finished material 3. For example, in the case of resin film type 8552 by the company Hexcel Composites GmbH, D-61373 Munich, (SPE-J-513-2-3025) the holding stage can be initiated at 120° C. and maintained for a duration of 30 min.

During the second holding stage, the resin which infiltrated the textile semi-finished material 3 during the first holding stage is cured. The duration of such curing depends on the type of resin film used. In the case of the previously mentioned resin film type 8552, the second holding stage can, for example, be initiated at 180° C. and maintained for a duration of 120 min.

The pressure curve p(t) is such that an optimal quality and a desired fibre volume percentage of approx. 60% is achieved in the cured component. To this effect, after completion of the first half of the first holding stage of the temperature curve δ(t), the autoclave is subjected to a constant pressure, usually between 3 bar and 10 bar.

The maximum size of plastic components which can be produced using the method according to the present invention is only limited by the size of the available production devices such as, for example, the sewing machines or weaving looms or the autoclave. There is no minimum size for the plastic components. The maximum thickness of the plastic components depends on the resin film types used. From a certain thickness onward, due to the associated increased resin quantities infiltrated, during curing an exothermal reaction in the resin may occur, which in extreme cases can lead to combustion of the resin and thus to an unusable plastic component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fiber-reinforced plastic component, comprising:
    prefabricating an unwindable part of the plastic component as a prepreg semi-finished material;
    prefabricating a non-unwindable part of the plastic component as a textile semi-finished material;
    placing said prepreg semi-finished material and said textile semi-finished material in a curing device;
    applying a resin film to said textile semi-finished material;
    evacuating said curing device;
    subjecting said curing device to temperature and pressure treatment in an autoclave; and
    joining said textile semi-finished material and said prepreg semi-finished material to form said fiber-reinforced plastic component.

2. A method according to claim 1, wherein said curing device comprises a flexible vacuum hood.

3. A method according to claim 1, wherein the textile semi-finished material comprises at least one of carbon, glass, or aramide fibers.

4. A method according to claim 1, wherein said prefabricating of the textile semi-finished material is by embroidering, braiding, or weaving.

5. A method according to claim 1, wherein the prepreg semi-finished material is a skin field of a planking field of an aircraft fuselage.

6. A method according to claim 1, wherein the textile semi-finished material is a stiffening profile in an LZ-shape for a planking field of an aircraft fuselage.

7. A method for producing a fiber-reinforced plastic component, comprising:
    placing a prepreg semi-finished material and a textile semi-finished material in a curing device;
    applying a resin film to said textile semi-finished material;
    evacuating said curing device;
    subjecting said curing device to temperature and pressure treatment in an autoclave; and
    joining said textile semi-finished material and said prepreg semi-finished material to form a fiber-reinforced plastic component.

8. A method for producing a fiber-reinforced plastic component, comprising:
    placing a prepreg semi-finished material in a curing device;
    positioning a textile semi-finished material on the prepreg semi-finished material in said curing device;
    applying a resin film onto a surface of said textile semi-finished material;
    evacuating said curing device by applying a vacuum;
    subjecting said curing device to a temperature treatment and a pressure treatment in an autoclave;
    infusing said resin film into said textile semi-finished material; and
    joining said textile semi-finished material and said prepreg semi-finished material to form a fiber-reinforced plastic component.

9. A method according to claim 8, wherein said subjecting said device to a temperature treatment comprises:
    a first holding stage in which a temperature is held constant while said resin film infuses into said semi-finished textile material;
    increasing the temperature; and
    a second holding stage in which the temperature is held constant, thereby curing the resin infused into the semi-finished textile material.

10. A method according to claim 9, wherein after a first half of the first holding stage, the autoclave is subjected to a constant pressure.

11. A method according to claim 8, wherein during positioning of said textile semi-finished material on said prepreg semi-finished material, the semi-finished textile material is supported by a removable profile tool.

12. A method for producing a fiber-reinforced plastic component, consisting of:
    placing a prepreg semi-finished material in a curing device;
    positioning a textile semi-finished material on the prepreg semi-finished material in said curing device;
    applying a resin film onto a surface of said textile semi-finished material;
    evacuating said curing device by applying a vacuum;
    subjecting said curing device to a temperature treatment and a pressure treatment in an autoclave;
    infusing said resin film into said textile semi-finished material; and
    joining said textile semi-finished material and said prepreg semi-finished material to form a fiber-reinforced plastic component.

* * * * *